United States Patent Office 3,089,015
Patented May 7, 1963

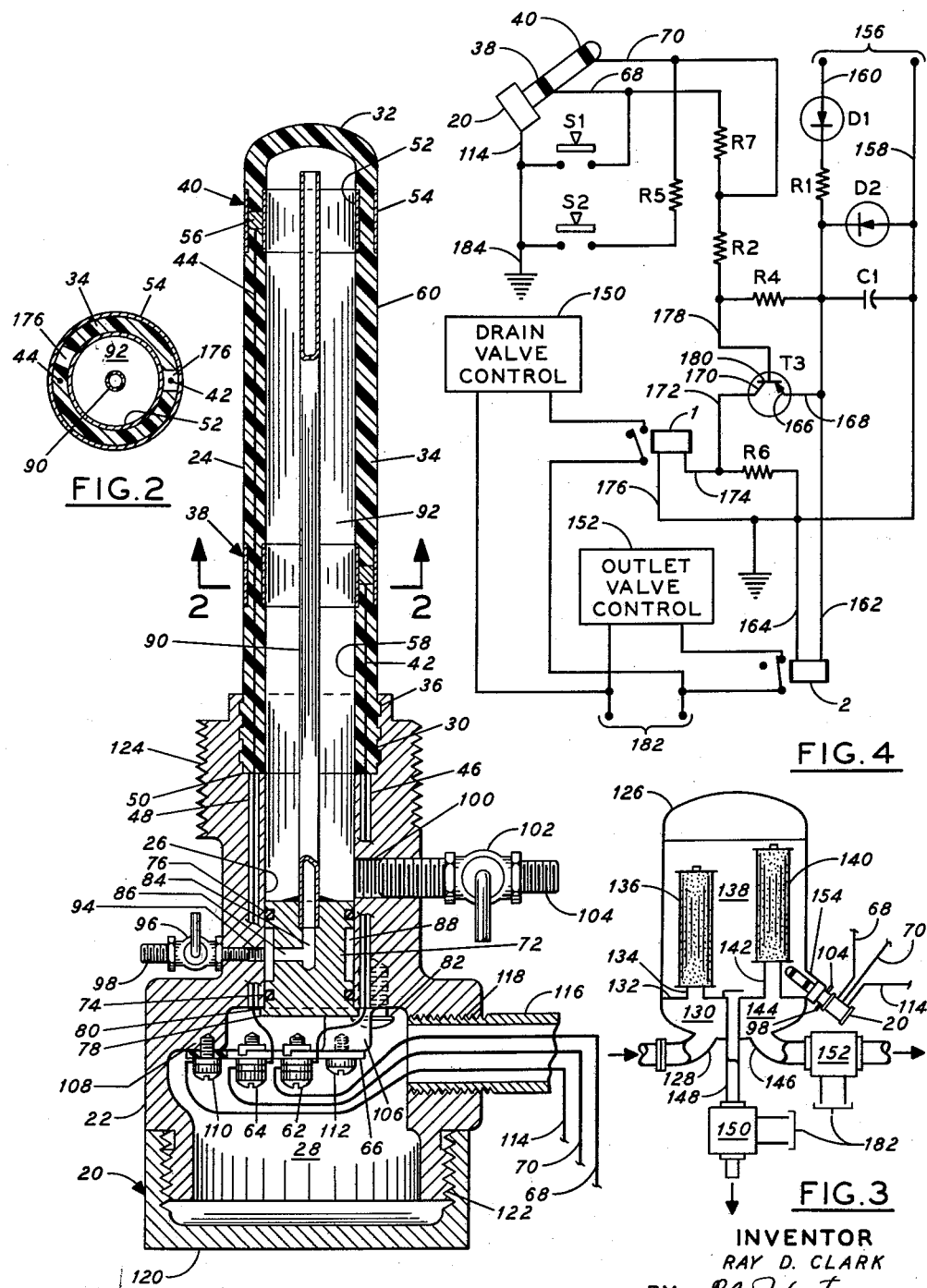

3,089,015
ELECTRODE PROBE
Ray D. Clark, Oakland, Calif., assignor to California Research Corporation, San Francisco, Calif., a corporation of Delaware
Filed Mar. 20, 1961, Ser. No. 96,883
4 Claims. (Cl. 200—152)

This invention is directed to an electrode-carrying probe and more particularly to the structure of a probe which permits the proper functioning of the electrode to be tested by producing a test signal from the electrode similar to the signal which the electrode emits during normal operation.

The invention has particular application to an electrode-carrying probe which is used as a sensing element in a control circuit for controlling the operation of apparatus in which material is being processed and wherein the operation of the apparatus is controlled in accordance with changing physical conditions of the material, which the probe senses. One example of apparatus of this type is that for processing a hydrocarbon fuel to separate entrained water from it prior to dispensing the fuel for ultimate use. As applied to fuel dispensing systems for aircraft, such apparatus may include a water-separating and filtering unit through which the fuel is processed. The intermixed fuel and water is directed through a cartridge of coalescing material within the unit to accumulate the entrained water into droplets which precipitate and are collected as a body of water in the bottom of the unit. The water-free fuel then passes through a filter cartridge within the unit and thence to a dispensing manifold.

As the entrained water is separated from the fuel, it collects in the bottom of the water-separating unit on a collector plate. A valve controlled drain is provided in the collector plate through which the separated water can periodically be removed.

It is desirable to remove the collected water before it accumulates in a sufficient amount to interfere with the operation of the filter medium and present the possibility of being carried through the filter cartridge and re-introduced into the fuel stream. If the circumstance arises where the draining apparatus malfunctions, or does not have the capacity to remove the separated water at a sufficient rate to prevent it from rising above a predetermined level above the collector plate, then it is desirable to take the unit off stream for adjustment and to place it in a condition to function properly.

The electrode-carrying probe of the present invention may, to illustrate an example of its use, be placed in the bottom portion of such a water-separating unit to sense various levels of water accumulating therein and, accordingly, to generate the signals in a control circuit connected to the electrodes to control automatically the operation of the drain valve or to take the unit off stream when it is becoming flooded with water.

It is of importance in such a control system, particularly where critical materials such as aircraft fuel are being processed, that the proper operation of the sensing probe be assured to prevent a malfunction of the apparatus from permitting water to be carried with the fuel to the fuel tanks of the aircraft, or from permitting the fuel to be wasted through the drain of the water-separating unit. This invention provides a means for testing the operation of the electrodes, and of the control circuit connected to them, in a manner which simulates the operation of the electrodes and associated control circuit under actual operating conditions.

Although the separation of water from a stream of fuel oil has been mentioned as an example of a process in which the apparatus of the present invention can be employed, it will be appreciated, as the description of the invention proceeds hereinafter, that it has utility in other processes where electrolytes other than water are separated from carrier streams other than fuel oil.

It is an object of this invention to provide a novel form of electrode-carrying probe for sensing the presence of an electrolyte.

Another object of this invention is to provide a novel probe structure, the operation of which can be tested by means simulating actual operating conditions and while the probe is installed in processing apparatus in which it is designed to function.

A further object of this invention is to provide a novel means for testing the operability of an electrolyte sensing electrode.

These and other objects will become apparent as the description of the invention proceeds hereinafter in conjunction with the accompanying drawings which form part of this application.

In the drawings:

FIG. 1 illustrates in sectional elevation an electrode-carrying probe made in accordance with this invention.

FIG. 2 is a plan view taken along the line 2—3 of FIG. 1.

FIG. 3 represents a schematic illustration of a water-separating unit with the probe of the present invention installed therein.

FIG. 4 is a schematic illustration of a control circuit for the water-separating unit of FIG. 3 and indicates the manner in which the electrodes of the present invention are connected in the circuit.

Referring to FIG. 1, the probe 20 comprises a metal base portion 22 to which is affixed in fluid-tight relationship an extending electrode-supporting portion 24 made of electrically insulating material. The base portion is formed with a bore 26 extending axially through it and communicating at one end with an enlarged chamber 28. The other end of the bore is enlarged by a counterbore 30 to receive one end of the extension 24 in fluid-tight relationship.

The extending portion 24 is made in the form of a hollow cylinder having an internal diameter equal to that of the bore 26 and closed at its free end by the end wall 32. The cylinder may be made by placing a core or mandrel through the bore 26 to extend the length of the cylindrical projection 24 and placing a mold around the mandrel with a radial clearance between the mandrel and the mold equal to the thickness of the wall 34 of the cylinder. A fluid resin is poured between the mandrel and the mold and flows into the counterbore portion 30, which may have serrations or circumferential grooves 36 formed in it to firmly anchor the projection 24 to the base 22. When the resin has set, the mold and mandrel are withdrawn.

Prior to casting the resin two axially spaced-apart electrode assemblies 38 and 40 are positioned in the space between the mandrel and the mold, and respective electrical conductors 42 and 44 are secured in electrical contact at one end to the corresponding electrodes and then threaded through complementary passages 46 and 48 formed axially through the base portion 22 parallel to the bore 26 and extending from the chamber 28 to the radial shoulder 50 which forms the base of the counterbored portion 30.

The electrode assemblies 38 and 40 are designed to be exposed to contact by an electrolyte, such as water, at both the outer and inner circumferential surfaces of the cylindrical projection 24. Each electrode assembly may be constructed with a pair of metallic rings 52 and 54, separated by metallic spacer elements 56 to which the rings are secured in electrical contact to dispose the ring 52 flush with the inner surface 58 of the projection 24 and the ring 54 flush with the exterior surface 60. When casting the probe extension 24, the fluid resin flows between the rings 52 and 54 and around the spacer elements 56 and interlocks the electrode assemblies and the respective electrical conductors 42 and 44 connected to them to and within the material of which the probe extension is made. This produces a unitary structure which will withstand hard usage without danger of physical damage which would result in faulty electrical connections. Although many materials, ranging from ceramics through plastics and rubbers, may be used for the probe extension, an epoxy resin has been found particularly suitable for probes employed in apparatus wherein water is separated from fuel oil.

The conductors 42 and 44 from the respective electrode assemblies 38 and 40 are electrically connected to respective terminals 62 and 64 on the terminal block 66 within the chamber 28 of the base portion 22. Respective conductor leads 68 and 70 may be attached to the appropriate terminals for connecting the electrode assemblies in a control circuit to function as first and second stage electrodes as described hereinafter.

The open lower end of the bore 26 is closed by a closure plug 72 into the periphery of which O rings 74 and 76 are inserted to form a fluid-tight seal between the closure plug and the inner wall of the bore. The closure plug is formed with a radially enlarged head portion 78 which bears against the shoulder 80 at the end of the bore 26 and is held firmly against the shoulder by the locking screw 82.

The closure plug 72 is formed with a central passage 84 extending partially through its axis and communicating with a radial passage 86, which in turn communicates with a peripheral channel 88 formed in the outer circumferential wall of the plug. A metal tube 90 is secured at one end in the passage 84 with the interior of the tube communicating with the passage. Preferably, the tube is welded or soldered to the plug 72 to provide a mechanically strong attachment of good electrical conductivity between the two parts.

When the closure plug 72 is inserted within the bore 26, the interior of the probe extension 24, together with the bore 26, forms a chamber 92 from which fluids are excluded except through the valve control passages to be described hereinafter. The tube 90 extends within the chamber 92 in coaxial alignment with the probe extension 24 to above the location of the topmost electrode 40. The free end of the tube is open and the interior of the tube is in communication with the chamber 92.

The base 22 has a radial passage 94 formed through it in alignment with the circumferential channel 88 of the closure plug. A valve 96 is secured to the outer end of the radial passage 94, and a connector for pipe or tubing, such as the threaded nipple 98, may be secured to the valve. A second radial passage 100 is formed through a base 22 to provide a communicating conduit from the exterior of the base to the chamber 92. A valve 102 is secured to the outer end of this passage and a connector for pipe or tubing such as the threaded nipple 104 is secured to the valve.

The terminal block 66 is secured to bosses 106 and 108 within the chamber 28 by respective screws 110 and 112, the former of which acts as a ground connection to the metallic base portion 22 for the electrical conductor 114. A conduit 116 is inserted through the peripheral wall of the base portion in a fluid-tight connection as by screw threads 118 and communicates with the chamber 28. The electrical conductors 68, 70 and 114 are electrically insulated from each other and are threaded through the conduit 116 to connect the electrodes 38 and 40 to a control circuit, as will be described hereinafter. A closure member 120 is detachably affixed to the base portion 20, as by screw threads 122 to seal the chamber 28 and keep it clean and dry while permitting access to the terminal block 66.

In the illustrated embodiment of the invention, screw threads 124 are formed in a peripheral surface of the base portion 22 adjacent to the probe extension 24 to enable the probe to be mounted with a fluid-tight connection in an appropriate fitting on the processing apparatus, with the electrode-carrying probe extension 24 disposed within the apparatus and the base portion 22 accessible at the exterior of the apparatus.

FIG. 3 is a schematic illustration of the sensing probe installed in processing apparatus. The processing apparatus chosen for this illustration is a water-separating and filtering unit such as is used in a fueling system for aircraft. This unit is an article familiar to the art. It may comprise a pressure vessel 126 having an inlet conduit 128 which receives a mixture of fuel and entrained water from a supply pump not shown. The mixture flows into a chamber 130 within the vessel below the fluid-tight collector plate 132 and thence through a nipple 134 through the collector plate to the interior of a hollow cartridge 136 which is made with a wall of porous material. The mixture is forced through the porous wall of the cartridge and into the interior chamber 138 of the vessel. As the mixture flows through the wall of the cartridge, the entrained water is coalesced into particles of larger size which separates by gravity from the carrier fuel oil. The water collects as a separated body of water on the collector plate 132 at the bottom of the vessel.

The water-free oil is forced through a filter cartridge 140 and flows through a nipple 142 into a chamber 144 below the collector plate and separated from the chamber 130 and thence through a valve controlled outlet conduit 146 to a dispensing manifold and subsequently the fuel tanks of the aircraft.

The nipple 142 holds the filter cartridge 140 spaced above the collector plate 132 a distance which permits a predetermined quantity of water collect above the collector plate before the water contacts the filter cartridge. A valve controlled drain conduit 148 is set into the collector plate to enable the collected water to be drained out of the unit.

When the apparatus of the present invention is employed with the water-separating unit described above, the drain conduit 148 and the outlet conduit 146 are controlled by respective electrically actuated valves, indicated schematically by the numerals 150 and 152. These valves are operated automatically by a control circuit to which the electrodes of the sensing probe are connected to cause the valves to open or close in accordance with the quantity of water accumulated above collector plate 132, through a sequence of operations and in a manner to be described more fully hereinafter. The sytem is designed to maintain the proper functioning of the water-separating unit and to close this unit down and take it off stream when the possibility occurs that water will pass through the unit to the fuel tanks of the aircraft. The structure of the probe of the present invention permits it to be tested while installed in a processing apparatus to assure that the electrodes are functioning properly and will send appropriate signals to the control circuit to cause the valves of the processing apparatus to be actuated as required to maintain a safe operating condition.

In the exemplary arrangement illustrated in FIG. 3, the electrode-carrying portion 24 of the probe is inserted into the interior chamber 138 of the water-separating unit through a fitting 154, into which the probe is screwed in water-tight relationship to position the lower or first-stage electrode 38 at a predetermined level above the collector plate 132 and the upper or second stage electrode 40 at a higher level, but below the bottom of the filter cartridge 140. The electrodes are components of the electrical circuit which controls the operation of the drain valve 150, and the outlet valve 152 as the circuit is completed or broken by the body of water on the collector plate contacting or receding from an electrode. The water completes the circuit from the electrode to the metal wall of the water-separating vessel to which the circuit is grounded.

A control circuit which may be used in conjunction with the sensing probe is illustrated in FIG. 4. In this circiut a power supply indicated by the numeral 156 is connected between a ground line 158 and the positive or hot conductor 160. The control circuit may be used with either an A.C. or D.C. supply. When an A.C. supply is used, conductor 160 is connected to a diode rectifier D1. When a D.C. supply is used, this diode is not required. A dropping resistor R1 is connected in series with the diode D1, and a voltage control diode D2, which may be a Zener diode, is connected across the circuit.

Filtering capacitor C1 is connected in the circuit in parallel with the diode D2 to smooth out variations in current resulting either from an A.C. power supply or from an unfiltered D.C. supply.

A relay 2 is connected across the circuit in parallel with capacitor C1 by means of conductor 162 which connects with the positive line 160 and the conductor 164 which connects with ground line 158. This relay actuates the outlet valve control of the water-separating unit.

A transistor T3, which includes base, emitter and collector components, is connected in the circuit with the emitter 166 connected to the positive side through conductor 168 and the collector 170 connected in series with a relay 1 through the conductors 172 and 174, the relay being connected to ground through the conductor 176. Relay 1 actuates the drain valve control of the water-separating unit.

The first-stage electrode 38 of the probe is connected by conductor 68 through stage-separation resistor R7 and buffer resistor R2 and conductor 178 with the base 180 of transistor T3. The second-stage electrode 40 also is connected with the base 180 of transistor T3, through conductor 70 and resistor R2 and conductor 178, but by-passes resistor R7. The buffer resistor R2 is a current limiting resistor which prevents excessive transistor current flow if the probe electrodes should be grounded accidentally.

Biasing resistor R4 is connected between the base and the emitter of the transistor to improve its thermal stability. A by-pass resistor R6 is connected in parallel with relay 1 between the collector of transistor T3 and ground to provide a path for the transistor current and assure the operation of relay 2 should the coil circuit of relay 1 open or otherwise become unable to pass the transistor current.

Switches S1 and S2 are placed respectively in the circuits associated with the first-stage electrode 38 and the second-stage electrode 40 with switch S1 completing a circuit from ground through stage-separation resistor R7 and switch S2 completing a circuit from ground through loading resistor R5 to impress a signal on the base 180 of transistor T3 comparable to the signal generated when the corresponding electrode is immersed in the collected water. These switches enable the operation of the circuits associated with the electrodes to be tested but do not test the proper functioning of the probe electrodes as such.

A description of the operation of the control system follows. For the purpose of this description it will be assumed that the power supply 156 is a source of 115 volts A.C. However, it will be appreciated that the circuit can be balanced to operate for other values of voltage from an A.C. source, or as mentioned heretofore, a D.C. source of power may be used.

The alternating current is rectified by diode D1, and resistor R1 and capacitor C1 function as a filter circuit to smooth out the rectified current. Resistor R1 functions also as a voltage-dropping resistor and has a normal input of 64 volts from diode D1. Voltage control diode D2 has a breakdown rating of 24 volts. The resistor R1 is selected to conduct approximately 13 milliamperes, of which 3 milliamperes flow through the diode D2 and 10 milliamperes are available at relay 2 during normal operations.

Relay 2 is connected in parallel across the power supply and is adjusted to be energized to engage its contacts when the current flow across it is in the range of 6 to 7 milliamperes and to be de-energized to open its contacts when the current flow drops to approximately 3 milliamperes. Transistor T3 is connected in parallel with relay 2. When the transistor is conducting, the increased transistor current in conjunction with the voltage-dropping resistor R1 reduces the voltage at relay 2 below the amount necessary to hold it energized, and the relay becomes de-energized. As mentioned heretofore, relay 2 controls the operation of the outlet valve control 152. When relay 2 is energized, the outlet valve is held open and the dry fuel from the water-separating unit flows through the outlet-conduit 146. When relay 2 is de-energized, the outlet valve closes and prevents the contents of the water-separating unit from flowing through the outlet conduit.

Relay 1 is selected to be energized normally by a current flow of approximately 3 milliamperes and to be de-energized or drop out when the current flow is reduced to approximately 1.5 milliamperes. When the first-stage electrode 38 is contacted by water, the current flowing from it to the base 180 of the transistor is reduced by resistor R7 to an amount which will prevent the transistor from conducting a current substantially in excess of the 3 milliamperes required to energize relay 1. At this time, the current flowing through relay 2 is reduced from the initial current of about 10 milliamperes to about 7 milliamperes but is still adequate to maintain relay 2 energized. As mentioned heretofore, relay 1 controls the operation of drain valve control 150. In normal operation of the apparatus, there is no current flowing through transistor T3 and relay 1 is de-energized, under which condition the drain valve is closed. However, since relay 2 is connected across the power source it is energized in its normal condition of operation and the outlet valve is held open.

It will be appreciated that relay 1 and relay 2 actuate the operation of the respective valves associated with them by switching on and off a source of power 182 connected to the respective valve control units 150 and 152. Valve control apparatus which may be used in this environment is known to the art.

When the first-stage electrode 38 is contacted by water, a signal is imposed on the base of transistor T3 which causes the transistor to pass a current. Thus, relay 1 is energized and the drain valve opens to drain the accumulated water from the water-separating unit while the outlet valve remains open permitting the dry fuel to flow through the outlet conduit 146. Should the collected water continue to rise in the water-separating unit, the second-stage electrode 40 becomes immersed and an additional signal is imposed on the base of transistor T3 which results in a greater current flow through the transistor. This current flows partly through relay 1 and partly through resistor R6, and relay 1 remains energized to hold the drain valve open. However, the current flow through the transistor is now great enough to reduce the current flow to relay 2 to approximately 1 or 2 milliamperes. Relay 2 is adjusted to become de-energized at this current flow and hence it drops out, causing the outlet valve to close. Relay 1 remains energized and the drain valve remains open. As the water recedes from contact with second-stage electrode 40 the additional signal imposed by this electrode on the base of the transistor ceases and the current through the transistor is reduced to that resulting from a signal imposed by the first-stage electrode 38. Additional current again flows through relay 2, which is energized to open the outlet valve. However, the drain valve remains open until sufficient water drains from the water-separating unit to break contact with and open the circuit at the first-stage electrode. At this time, the drain valve closes. Thus, a fully automatic control is provided to open and close the drain valve and the outlet valve and take the water-separating unit off stream or place it on stream in the sequence of operations required for the proper functioning of the apparatus.

As explained heretofore, the switches S1 and S2 are included in the control circuit to permit the operation of the components to be tested by completing the circuits to ground through the switches to thereby impose corresponding signals on the base of the transistor. The switch circuits bypass the electrode-carrying probe and do not depend on the probe for creating or transmitting the test signals. Hence, it is possible that while a test switch indicates an operable circuit, the probe can be malfunctioning and unable to generate the appropriate signals for the proper control of the water-separating unit.

For instance, by way of example, if the electrical connection between the topmost electrode 40 and the control circuit is broken within the probe, no signal will be transmitted from the electrode to close the outlet valve to take the water-separating unit off the line when this electrode becomes immersed in water, even though closing switch S2 will create a signal indicating that the circuit is operating. Should such a malfunction occur, it would be possible for the water collecting in the bottom of the water-separating unit to reach a level at which it would pass through the filter cartridge 140 and into the outlet conduit 146 with no indication in the control system that the fuel being dispensed to the aircraft contained water. A feature of the apparatus of the present invention is an arrangement which permits testing of the operability of each electrode in the system.

In testing the electrodes, a source of water or other electrolyte similar to the electrolyte to which the probe will be exposed during normal operation is introduced into the chamber 92 through the opened valve 102 and passage 100. When the probe extension 24 is made of an opaque substance, or when the probe is installed in a vessel and is not visible, a measured amount of electrolyte is introduced into the chamber 92 sufficient to contact and partly immerse the inner ring 52 of the first-stage electrode assembly 38. The air trapped within the probe extension escapes through the tube 90 and the valve 96, the latter being open for this function. The electrolyte within the chamber 92 completes an electrically conducting circuit between the electrode 38 and the metal tube 90, which is an electrical contact with the base 22 of the probe and hence is grounded to the metal portions of the water-separating unit in which the probe is installed. Thus, the control circuit is energized to operate the drain valve in the same manner as it would as the result of a signal generated by an electrolyte contacting the outer ring 54 of the electrode assembly 38 and completing a conducting path between the electrode and the metal walls of the water-separating unit in which the probe is installed.

When the probe extension 24 is made of a transparent or translucent substance, as an epoxy resin, and when the probe extension is visible, then the amount of electrolyte placed within the chamber 92 can be controlled by visual observation to introduce into the chamber a sufficient amount to contact the appropriate electrode stage. In either circumstance, sufficient electrolyte is placed within the chamber 92 to contact in turn each of the electrode stages to test the proper functioning of the electrodes and the control circuit connected to them. Also, the electrolyte is withdrawn from the chamber 92 through the passage 100 and the opened valve 102 to test in turn the operation of each electrode stage and the associated circuit as the level of the electrolyte recedes from contact with the electrode.

In some installations, it will be preferable to install the probe in a position inverted to that shown in FIG. 1, with the wiring at the terminal block 66 arranged so that the signal from the appropriate electrode operates the proper valve of the apparatus. When the probe is to be tested in this inverted position, preferably the electrolyte is introduced into the chamber 92 through the opened valve 96, the passage 94 and the tube 90 to what will then be the lowermost part of the probe, and the air escapes through the passage 100 and the opened valve 102. By this means the electrolyte will be prevented from forming a conducting bridge along the inner wall 58 of the probe extension across the electrode stages 38 and 40 which would cause false signals to be emitted from the probe.

In the modification of the invention illustrated in FIG. 1, the base 22 of the probe and hence the tube 90 is connected to ground through conductor 114, as described heretofore. This permits the proper functioning of the electrode stages to be tested on a work bench or test stand where the probe is not grounded by a metallic contact with the remainder of the apparatus. Under these conditions, the conductor 114 is connected to the grounded line 184 of the circuit described heretofore, hence providing an electrical connection from the electrodes 38 and 40 through an electrolyte within the chamber 92 through the tube 90 and base 22 to ground. It will be appreciated that test lamps or meters can be used to indicate the proper functioning of the electrodes or such devices can, for test purposes, be placed in the control circuit in place of the valve apparatus.

It is within the concept of this invention that the probe structure shown in FIG. 1 may be modified to provide a portable instrument which can be inserted into a vessel, as through a top opening thereof, without affixing it to the vessel, to determine the level of water or other electrolyte at the bottom of the vessel. For this purpose, the probe extension 24 may be affixed to the end of a long handle, preferably of an electrically insulated material, through which the passages 94 and 100 and the electrical conductors 68, 70 and 114 are extended to be accessible at the exterior of the vessel into which the probe is inserted. When the probe is used in this manner, the various electrode stages may be connected to different indicator means to give information as to which of the electrode stages is in contact wtih the electrolyte. The proper functioning of the electrode stages may be checked or tested as explained heretofore by introducing measured amounts of a separate body of an electrolyte into the chamber 92.

Although a unitary structure, which is the preferred embodiment of this invention, has been described herein, it is within the concept of this invention to form the probe elements such as the probe extension 24 and the electrode stages 38 and 40, as well as the base portion 22, as separate units which subsequently are assembled together to perform the function of the probe structure described.

It will be apparent from the foregoing description of this invention that it attains the objects for which it is designed and provides a novel electrode-carrying probe, the operability of which can be tested in a manner simulating actual operating conditions to assure the proper functioning of its components.

I claim:

1. A probe comprising a member of electrically insulating material, a chamber within said member, at least one first electrode affixed to said member and exposed to contact by a first body of an electrolyte at the exterior surface of said member and by a separate second body of an electrolyte within said chamber, a second electrode disposed within said chamber in spaced-apart relationship to said first electrode and exposed to contact by said second body of an electrolyte within said chamber, means for introducing said second body of an electrolyte into said chamber and for withdrawing it therefrom independently of an amount of said first body of an electrolyte in contact with the said exterior surface of said member, said probe being designed to control the operation of apparatus in accordance with the level of contact of said first body of electrolyte at the said exterior surface of said member when said chamber is empty of said second body of electrolyte, said second body of an electrolyte when present in said chamber forming an electrically conducting path between said first electrode and said second electrode.

2. A probe comprising an elongated member of electrically insulating material, an elongated chamber within said member, a plurality of electrodes affixed to said member in axially spaced-apart relationship with each other along said member and exposed to contact by an electrolyte at both the exterior surface of said member and within said chamber, a separate electrode disposed within said chamber in spaced apart relationship to said plurality of electrodes and exposed to contact by an electrolyte within said chamber, means for introducing a first body of an electrolyte into said chamber and for withdrawing said first body of said electrolyte from said chamber, and means for contacting the exterior surface of said member with a second body of an electrolyte while excluding said second body of said electrolyte from said chamber, said probe being designed to control the operation of apparatus in accordance with the level of contact of said second body of an electrolyte at the said exterior surface of said member when said chamber is empty of said first body of an electrolyte.

3. A probe comprising a hollow cylindrical member of electrically insulating material, closure means at both ends of said member and forming a fluid-tight chamber within that member, a plurality of electrodes affixed to said member in axially spaced-apart relationship to each other and exposed to contact by an electrolyte at both the exterior surface of said member and within said chamber, a tubular electrode extending axially within said chamber and exposed to contact by an electrolyte within said chamber, said tubular electrode forming a passageway into and out of said chamber, a conduit communicating with said chamber and forming a second passageway into and out of said chamber, means including one said passageway for introducing an electrolyte into said chamber and for withdrawing said electrolyte from said chamber, and respective electrical conductors connected to said electrodes and to means for connecting said electrodes into a control circuit.

4. A probe comprising a base portion of electrically conducting material, a hollow cylindrical member of electrically insulating material closed at one end thereof in a fluid-tight manner and secured at the other end thereof to said base portion in a fluid-tight manner to form a fluid-tight chamber within said member, a first ring of electrically conducting material secured to the wall of said member within said chamber and proximate to said base portion, a second ring of electrically conducting material secured to the exterior wall of said member and in radial alignment with said first ring, means electrically connecting said first ring and said second ring to form a first-stage electrode, a third ring of electrically conducting material secured to the wall of said member within said chamber and axially spaced-apart from said first ring and from said base portion, a fourth ring of electrically conducting material secured to the exterior wall of said member in radial alignment with said third ring, means electrically connecting said third ring and said fourth ring to form a second-stage electrode, a tube of electrically conducting material secured at one end to said base portion in electrical contact therewith and extending within said chamber in coaxial alignment with said member and terminating with an open end at substantially the location of said second-stage electrode, a first passageway formed through said base portion and communicating with the interior of said tube, a second passageway formed through said base portion and communicating with said chamber, and respective electrical conductors connecting said first-stage electrode and said second-stage electrode with respective electrical connector means mounted on said base portion.

References Cited in the file of this patent
UNITED STATES PATENTS
2,797,702    Martin _____ July 2, 1957